United States Patent
Ijichi et al.

(10) Patent No.: US 12,276,936 B2
(45) Date of Patent: Apr. 15, 2025

(54) BINDER RESIN COMPOSITIONS FOR TONER

(71) Applicant: Kao Corporation, Tokyo (JP)

(72) Inventors: Kota Ijichi, Izumiotsu (JP); Kunihiro Kano, Wakayama (JP); Nobumichi Kamiyoshi, Wakayama (JP)

(73) Assignee: Kao Corporation, Tokyo (JP)

( * ) Notice: Subject to any disclaimer, the term of this patent is extended or adjusted under 35 U.S.C. 154(b) by 742 days.

(21) Appl. No.: 17/623,087

(22) PCT Filed: Apr. 30, 2020

(86) PCT No.: PCT/JP2020/018253
§ 371 (c)(1),
(2) Date: Dec. 27, 2021

(87) PCT Pub. No.: WO2020/261762
PCT Pub. Date: Dec. 30, 2020

(65) Prior Publication Data
US 2022/0269188 A1 Aug. 25, 2022

(30) Foreign Application Priority Data
Jun. 28, 2019 (JP) ................. 2019-121072

(51) Int. Cl.
*G03G 9/087* (2006.01)
*C08G 63/183* (2006.01)

(52) U.S. Cl.
CPC ....... *G03G 9/08755* (2013.01); *C08G 63/183* (2013.01); *G03G 9/08704* (2013.01)

(58) Field of Classification Search
CPC ........... G03G 9/08704; G03G 9/08755; G03G 9/08788
See application file for complete search history.

(56) References Cited

U.S. PATENT DOCUMENTS

| | | | |
|---|---|---|---|
| 4,845,158 A | * | 7/1989 | Peters ............... C08G 64/18 |
| | | | 525/333.1 |
| 2005/0164113 A1 | | 7/2005 | Iwata |
| 2020/0231724 A1 | | 7/2020 | Kumar et al. |
| 2021/0141317 A1 | | 5/2021 | Wakabayashi et al. |
| 2021/0301048 A1 | | 9/2021 | Gobin et al. |

FOREIGN PATENT DOCUMENTS

| | | | |
|---|---|---|---|
| JP | 2000-250264 A | 9/2000 | |
| JP | 2004-4806 A | 1/2004 | |
| JP | 2005-316378 A | 11/2005 | |
| JP | 2009-14820 A | 1/2009 | |
| JP | 2019-8185 A | 1/2019 | |
| JP | 2021-6867 A | 1/2021 | |
| WO | WO 2019-075331 | * 4/2019 | ............ C08F 210/10 |
| WO | WO 2019/075331 A2 | 4/2019 | |

OTHER PUBLICATIONS

Extended European Search Report issued May 23, 2023 in European Patent Application No. 20830764.5, 6 pages.
International Search Report issued Jul. 21, 2020 in PCT/JP2020/018253 (submitting English translation only), 2 pages.

* cited by examiner

*Primary Examiner* — Peter L Vajda
(74) *Attorney, Agent, or Firm* — Oblon, McClelland, Maier & Neustadt, L.L.P.

(57) ABSTRACT

A resin binder composition for toners, containing a polyester resin A that is a polycondensate of an alcohol component containing 80% by mol or more of an aliphatic diol having 2 or more carbon atoms and 6 or less carbon atoms and a carboxylic acid component containing an aromatic dicarboxylic acid compound and an amorphous acid modified product A of an α-olefin polymer having 4 or more carbon atoms and 18 or less carbon atoms; and a toner for electrostatic image development, containing these resin binder composition for toners. The resin binder composition for toners of the present invention is suitably used for a toner for electrostatic image development which is usable in development of latent images formed in, for example, electrostatic image development method, electrostatic recording method, electrostatic printing method or the like.

20 Claims, No Drawings

BINDER RESIN COMPOSITIONS FOR TONER

FIELD OF THE INVENTION

The present invention relates to a resin binder composition for toners which are usable in development of latent images formed in, for example, electrophotography, electrostatic recording method, electrostatic printing method or the like, and a toner for electrostatic image development containing the resin binder composition.

BACKGROUND OF THE INVENTION

Patent Publication 1 discloses a color toner comprising a toner binder (A), a wax (B), and a colorant (C), characterized in that (A) comprises a resin (D) containing 1 to 50% by weight of a hydrocarbon group having 8 or more carbon atoms, and that (A) has a haze value of 70 or less.

Patent Publication 2 discloses a polyester-based resin composition for toners, characterized in that the polyester-based resin composition contains a compatibilization agent capable of compatibilizing a polyester and a wax in a toner containing a resin binder comprising at least a polyester and a wax, characterized in that the compatibilization agent is a product of the polyester reacted with a maleic anhydride-modified polyolefin.

Patent Publication 3 discloses a resin binder composition for toners, containing an amorphous polyester-based resin, comprising a constituting moiety derived from a polyester resin and a constituting moiety derived from a modified polypropylene-based polymer A having a carboxylate group or a carboxylate anhydride group, wherein the constituting moiety derived from a polyester resin and the constituting moiety derived from a modified polypropylene-based polymer A are linked with a covalent bonding, wherein the polymer A is a polypropylene-based polymer which is modified at an end with a carboxylic acid compound or an anhydride thereof, each having an unsaturated bond, wherein the amount of the constituting unit derived from the polymer A in the above polyester-based resin is 8 parts by mass or more and 30 parts by mass or less, based on 100 parts by mass of a total amount of the alcohol component and the carboxylic acid component for forming the constituting moiety derived from a polyester resin.

Patent Publication 1: Japanese Patent Laid-Open No. 2000-250264

Patent Publication 2: Japanese Patent Laid-Open No. 2005-316378

Patent Publication 3: Japanese Patent Laid-Open No. 2019-008185

SUMMARY OF THE INVENTION

The present invention relates to:

[1] a resin binder composition for toners, containing a polyester resin A that is a condensate of an alcohol component containing 80% by mol or more of an aliphatic diol having 2 or more carbon atoms and 6 or less carbon atoms and a carboxylic acid component containing an aromatic dicarboxylic acid compound and an amorphous acid modified product A of an α-olefin polymer having 4 or more carbon atoms and 18 or less carbon atoms; and

[2] a toner for electrostatic image development, containing a resin binder composition for toners as defined in the above [1].

DETAILED DESCRIPTION OF THE INVENTION

In the field of toners for electrophotography, there are needs such as high-speed printing and high-image quality, with the developments of electrophotographic systems. Among them, it is considered that polyester resins have excellent low-temperature fusing ability and storage property. However, since the polyester resins have high hygroscopicity, it is considered that there is a disadvantage in an initial rise in charging. In particular, nonbis polyester resins that do not contain a bisphenol A backbone in the alcohol component have high hygroscopicity, so that the initial rise in charging is likely to be drastically lowered.

Conventionally, as a means of improving hygroscopic resistance of the nonbis polyester resin, a method of reacting the polyester with a hydrophobic polyolefin has been considered. However, when the polyester is reacted with a crystalline macro-monomer having a hydrophobic alkyl group such as an acid modified product of an α-olefin polymer having 2 or 3 carbon atoms, it is difficult to sufficiently disperse the crystalline macro-monomer in the polyester resin, so that sufficient hygroscopic resistance cannot be obtained (see, for example, Patent Publications 2 and 3).

On the other hand, also in a case where an amorphous monomer having a hydrophobic alkyl group such as dodecenylsuccinic anhydride is incorporated into a polyester resin, while hygroscopicity effects are obtained to a certain extent, it is not yet sufficient. Even in a case where the monomer having an alkyl group is increased to an amount so that sufficient hygroscopic resistance effects are obtained, the polyolefin and the polyester resin are compatibilized to lower a glass transition temperature of the resin, whereby storage property is worsened (see, for example, Patent Publication 1).

The present invention relates to a resin binder composition for toners having excellent low-temperature fusing ability, storage property, initial rise in charging, and hygroscopic resistance, and a toner for electrostatic image development containing the resin binder composition.

The toner for electrostatic image development containing a resin binder composition of the present invention exhibits excellent effects in low-temperature fusing ability, storage property, initial rise in charging, and hygroscopic resistance.

One of the features of the resin binder composition for toners of the present invention is in the point that the resin binder composition contains a polyester resin A, using an acid modified product A of an α-olefin polymer having 4 or more carbon atoms and 18 or less carbon atoms. By using the acid modified product A, a hydrophobic polyolefin moiety in the acid modified product A can be homogeneously dispersed in a state of micro-phase separation in a polyester resin introduced with the acid modified product A, whereby the hygroscopic resistance of the polyester resin can be improved.

In addition, the acid modified product A is amorphous. By using the amorphous acid modified product A, the polyester resin has even more improved hygroscopic resistance, as compared to that of a crystalline acid modified product of an α-olefin polymer such as a modified polypropylene-based polymer having a carboxylate group or a carboxylate anhydride group. This is assumed to be due to the fact that the amorphous acid modified product A of the α-olefin polymer does not have a melting point, so that the acid modified product is allowed to spread in a wet state on the toner surfaces even when a hydrophobic polyolefin moiety is at a low temperature.

The crystallinity of the acid modified product is expressed by a crystallinity index ([softening point/highest temperature of endothermic peak]) in the same manner as the crystallinity of the resins described later. The amorphous acid modified product has a crystallinity index of exceeding 1.4, preferably exceeding 1.5, and more preferably 1.6 or more, or less than 0.6, and preferably 0.5 or less. In addition, those in which a highest temperature of endothermic peak is not detectable are judged to be amorphous.

The polyester resin A is a condensate of an alcohol component containing an aliphatic diol having 2 or more carbon atoms and 6 or less carbon atoms and a carboxylic acid component containing an aromatic dicarboxylic acid compound and an amorphous acid modified product A of an α-olefin polymer having 4 or more carbon atoms and 18 or less carbon atoms.

The alcohol component contains an aliphatic diol having 2 or more carbon atoms and 6 or less carbon atoms, from the viewpoint of low-temperature fusing ability. The aliphatic diol having 2 or more carbon atoms and 6 or less carbon atoms includes, for example, ethylene glycol, 1,2-propanediol, 1,3-propanediol, 1,4-butanediol, 1,5-pentanediol, neopentyl glycol, 1,6-hexanediol, and the like. Among them, one or more members selected from the group consisting of ethylene glycol, 1,2-propylene glycol, and neopentyl glycol are preferred, and a combination of ethylene glycol and neopentyl glycol is more preferred. The molar ratio of ethylene glycol to neopentyl glycol (ethylene glycol/neopentyl glycol) is preferably 15/85 or more, and more preferably 20/80 or more, and preferably 60/40 or less, and more preferably 50/50 or less.

The content of the aliphatic diol having 2 or more carbon atoms and 6 or less carbon atoms in the alcohol component is 80% by mol or more, preferably 90% by mol or more, more preferably 95% by mol or more, and even more preferably 100% by mol.

The alcohol components other than the aliphatic diol having 2 or more carbon atoms and 6 or less carbon atoms include, for example, aliphatic diols having 7 or more carbon atoms such as 1,8-octanediol; aromatic diols such as polyoxypropylene adduct of 2,2-bis(4-hydroxyphenyl)propane and polyoxyethylene adduct of 2,2-bis(4-hydroxyphenyl)propane; trihydric or higher polyhydric alcohols such as glycerol, and the like. The content of other alcohols in the alcohol component is preferably 20% by mol or less, more preferably 10% by mol or less, even more preferably 5% by mol or less, and even more preferably 0% by mol.

In the acid modified product A of the α-olefin polymer having 4 or more carbon atoms and 18 or less carbon atoms contained in the carboxylic acid component, the number of carbon atoms of the α-olefin is 4 or more, and 18 or less, preferably 10 or less, more preferably 7 or less, even more preferably 5 or less, and even more preferably 4.

The α-olefin polymer having 4 or more carbon atoms and 18 or less carbon atoms includes polyisobutene-based polymers, poly 1-butene-based polymers, poly 1-pentene-based polymers, poly 1-hexene-based polymers, poly 1-octene-based polymers, poly 4-methylpentene-based polymers, poly 1-dodecene-based polymers, poly 1-hexadecene-based polymers, propylene-hexene copolymers, and the like, and among them, the polyisobutene-based polymers are preferred. The above α-olefin polymer may be a homopolymer of the above α-olefin, or may be a copolymer of two or more members selected from the above α-olefins, or may be a copolymer of the above α-olefin with another olefin. In addition, the copolymer may be any one of random copolymers and block copolymers.

The polyisobutene-based polymer includes polyisobutenes, copolymers of isobutene and other olefins, and the like. The other olefins include, for example, ethylene, butene, pentene, hexene, and 2-ethylhexene. When the polyisobutene-based polymer is a copolymer, the proportion of isobutene is preferably 60% by mass or more, more preferably 80% by mass or more, and even more preferably 90% by mass or more, and less than 100% by mass.

On the other hand, the acid modified product A is preferably an acid modified product in which an α-olefin polymer having 4 or more carbon atoms and 18 or less carbon atoms is modified with at least one acid selected from the group consisting of maleic acid, fumaric acid, itaconic acid, and acid anhydrides thereof, and more preferably an acid modified product modified with maleic anhydride, from the viewpoint of the reactivities with the polyester resin. In addition, the acid modified product includes an acid modified product in a random graft form in which the above α-olefin polymer is randomly grafted and modified with an acid, an acid modified product in an end modification form in which an end of the above α-olefin polymer is modified with an acid, and the like. In the present invention, the acid modified product in an end modification form is preferred, and an acid modified product in a one-end modification form in which one end of the α-olefin polymer having 4 or more carbon atoms and 18 or less carbon atoms is modified with an acid is more preferred, from the viewpoint of low-temperature fusing ability and storage property.

The acid modified product in a random graft form is preferably such that one molecule of the polymer is grafted with one or more acids and modified. Whether or not the polymer is modified with an acid can be defined by a general spectroscopic measurement. For example, in a case of an acid modified product in a random graft form with maleic anhydride, when the polymer is modified with maleic anhydride, a double bond of maleic anhydride is changed to a single bond, so that the modification can be defined by the measurement of a spectroscopic change thereof.

The acid modified product in a random graft modification form is obtained by, for example, generating a radical within a molecule of an α-olefin polymer, and reacting the radical with a carboxylic acid compound or an anhydride thereof having an unsaturated bond.

The acid modified product in an end modification form is preferably one in which one molecule of the polymer is modified with one acid (one-end) or two acids (both-ends). Whether or not the polymer is modified with an acid can be defined by a general spectroscopic measurement. For example, in a case of an acid modified product in a one-end modification form with maleic anhydride, when the polymer is modified with maleic anhydride, a double bond of maleic anhydride is changed to a single bond, so that the modification can be defined by the measurement of a spectroscopic change thereof. In addition, since a spectroscopic change takes place just before or after binding at the connected portion at a side of the α-olefin polymer, this modification can be defined by the measurement by the change.

The acid modified product in a one-end form is obtained, for example, by subjecting the above α-olefin polymer having an unsaturated bond at one end to an Ene reaction with an acid. The above α-olefin polymer having an unsaturated bond at one end is obtained by a known method, and the polymer can be produced by using, for example, a vanadium-based catalyst, a titanium-based catalyst, a zirconium-based catalyst or the like.

As described above, it is preferable that the acid modified product A of the α-olefin polymer is a polyisobutene succinic anhydride modified with maleic anhydride at one end.

The weight-average molecular weight of the acid modified product A is preferably 500 or more, more preferably 700 or more, even more preferably 900 or more, and even more preferably 1,100 or more, from the viewpoint of storage property, and the weight-average molecular weight is preferably 5,000 or less, more preferably 4,000 or less, and even more preferably 3,000, from the viewpoint of low-temperature fusing ability.

The content of the acid modified product A, based on 100 parts by mass of a total amount of the alcohol component and the carboxylic acid component other than the acid modified product A, is preferably 3 parts by mass or more, more preferably 4 parts by mass or more, even more preferably 7 parts by mass or more, even more preferably 9 parts by mass or more, even more preferably 10 parts by mass or more, and even more preferably 15 parts by mass or more, from the viewpoint of the initial rise in charging and hygroscopicity, and the content is preferably 40 parts by mass or less, more preferably 30 parts by mass or less, even more preferably 25 parts by mass or less, even more preferably 23 parts by mass or less, and even more preferably 20 parts by mass or less, from the viewpoint of storage property.

The carboxylic acid component further contains an aromatic dicarboxylic acid compound, from the viewpoint of storage property.

The aromatic dicarboxylic acid compound includes phthalic acid, isophthalic acid, terephthalic acid, anhydrides and alkyl esters of these acids, the alkyl group having from 1 to 3 carbon atoms, and the like. Among them, terephthalic acid or isophthalic acid is preferred, and terephthalic acid is more preferred, from the viewpoint of low-temperature fusing ability.

The content of the aromatic dicarboxylic acid compound in the carboxylic acid component other than the acid modified product A of the α-olefin polymer is preferably 50% by mol or more, more preferably 60% by mol or more, and even more preferably 70% by mol or more, from the viewpoint of storage property. In addition, the content of the aromatic dicarboxylic acid compound in the carboxylic acid component when used together with a tricarboxylic or higher polycarboxylic acid compound is preferably 95% by mol or less, more preferably 90% by mol or less, even more preferably 85% by mol or less, and even more preferably 80% by mol or less, from the viewpoint of low-temperature fusing ability.

The carboxylic acid component other than the acid modified A and the aromatic dicarboxylic acid compound includes aliphatic dicarboxylic acid compounds, tricarboxylic or higher polycarboxylic acid compounds, and the like.

The aliphatic dicarboxylic acid compound includes aliphatic dicarboxylic acids such as oxalic acid, malonic acid, maleic acid, fumaric acid, citraconic acid, itaconic acid, glutaconic acid, succinic acid which may be substituted with an alkyl group having from 1 to 20 carbon atoms or an alkenyl group having from 2 to 20 carbon atoms, and adipic acid, and anhydrides and alkyl esters of these acids, the alkyl group having from 1 to 3 carbon atoms.

The tricarboxylic or higher polycarboxylic acid compound includes 1,2,4-benzenetricarboxylic acid (trimellitic acid), 2,5,7-naphthalenetricarhoxylic acid, pyromellitic acid, and anhydrides and alkyl esters of these acids, the alkyl group having from 1 to 3 carbon atoms, among which the trimellitic acid compounds are preferred.

The content of the tricarboxylic or higher polycarboxylic acid compound in the carboxylic acid component is preferably 1% by mol or more, more preferably 3% by mol or more, even more preferably 5% by mol or more, and even more preferably 7% by mol or more, and preferably 30% by mol or more, and more preferably 25% by mol or more.

The alcohol component may properly contain a monohydric alcohol, and the carboxylic acid component may properly contain a monocarboxylic acid compound.

The polyester resin A can be produced, for example, by polycondensing the alcohol component and the carboxylic acid component in an inert gas atmosphere at a temperature of preferably 130° C. or higher, and more preferably 170° C. or higher, and preferably 250° C. or lower, and more preferably 240° C. or lower, preferably in the presence of an esterification catalyst, further optionally in the presence of an esterification promoter, a polymerization inhibitor or the like.

The esterification catalyst includes tin compounds such as dibutyltin oxide and tin(II) 2-ethylhexanoate; titanium compounds such as titanium diisopropylate bistriethanolaminate; and the like. The amount of the esterification catalyst used is preferably 0.01 parts by mass or more, and more preferably 0.1 parts by mass or more, and preferably 1.5 parts by mass or less, and more preferably 1 part by mass or less, based on 100 parts by mass of a total amount of the alcohol component and the carboxylic acid component other than the acid modified product A. The esterification promoter includes gallic acid, and the like. The amount of the esterification promoter used is preferably 0.001 parts by mass or more, and more preferably 0.01 parts by mass or more, and preferably 0.5 parts by mass or less, and more preferably 0.1 parts by mass or less, based on 100 parts by mass of a total amount of the alcohol component and the carboxylic acid component other than the acid modified product A. The polymerization inhibitor includes t-butyl catechol, and the like. The amount of the polymerization inhibitor used is preferably 0.001 parts by mass or more, and more preferably 0.01 parts by mass or more, and preferably 0.5 parts by mass or less, and more preferably 0.1 parts by mass or less, based on 100 parts by mass of a total amount of the alcohol component and the carboxylic acid component other than the acid modified product A.

The polyester resin A may be a polycondensate of an alcohol component containing an aliphatic diol having 2 or more carbon atoms and 6 or less carbon atoms and a carboxylic acid component containing an aromatic dicarboxylic acid compound and an amorphous acid modified product A of an α-olefin polymer having 4 or more carbon atoms and 18 or less carbon atoms, or may be a polycondensate of a polycondensate of an alcohol component containing an aliphatic diol having 2 or more carbon atoms and 6 or less carbon atoms and a carboxylic acid component other than an amorphous acid modified product A of an α-olefin polymer having 4 or more carbon atoms and 18 or less carbon atoms, with the acid modified product A. The latter polycondensate is preferred, from the viewpoint of storage property.

Here, in the present invention, the polyester resin A may be a polyester resin modified with a material other than an acid to an extent that the properties thereof are not substantially impaired. The polyester resin modified with a material other than an acid includes, for example, a polyester resin grafted or blocked with a phenol, a urethane, an epoxy or the like according to a method described in Japanese Patent Laid-Open No. Hei-11-133668, Hei-10-239903, Hei-8-20636, or the like. Among the modified polyester resins, urethane-modified polyester resins in which polyester resins are urethane-extended with a polyisocyanate compound are preferred.

It is preferable that the polyester resin A is an amorphous resin. The crystallinity of the resin is expressed by a crystallinity index, which is defined by a ratio of a softening point to a highest temperature of endothermic peak as determined by a differential scanning calorimeter, i.e. a value of [softening point/highest temperature of endothermic peak]. The crystalline resin is a resin having a crystallinity index of 0.6 or more, preferably 0.7 or more, and more preferably 0.9 or more, and 1.4 or less, preferably 1.2 or less, and more preferably 1.1 or less, and on the other hand, the amorphous resin is a resin having a crystallinity index exceeding 1.4, and preferably exceeding 1.5, and more preferably 1.6 or more, or a resin having a crystallinity index of less than 0.6, and preferably 0.5 or less. The crystallinity of the resin can be adjusted in accordance with the kinds and the ratios of the raw material monomers, and the production conditions (for example, reaction temperatures, reaction time, cooling rate) or the like. Here, a highest temperature of endothermic peak refers to a temperature of the peak at the highest temperature side out of the observed endothermic peaks. In a crystalline resin, a highest temperature of endothermic peak is defined as a melting point.

The softening point of the polyester resin A is preferably 90° C. or higher, more preferably 120° C. or higher, and even more preferably 130° C. or higher, from the viewpoint of storage stability, and the softening point is preferably 160° C. or lower, more preferably 150° C. or lower, and even more preferably 140° C. or lower, from the viewpoint of low-temperature fusing ability.

The glass transition temperature of the polyester resin A is preferably 50° C. or higher, and more preferably 60° C. or higher, from the viewpoint of storage stability, and the glass transition temperature is preferably 80° C. or lower, more preferably 75° C. or lower, and even more preferably 70° C. or lower, from the viewpoint of low-temperature fusing ability.

The acid value of the polyester resin A is preferably 15 mgKOH/g or more, more preferably 20 mgKOH/g or more, and even more preferably 30 mgKOH/g or more, from the viewpoint of low-temperature fusing ability, and the acid value is preferably 70 mgKOH/g or less, more preferably 60 mgKOH/g or less, and even more preferably 50 mgKOH/g or less, from the viewpoint of hygroscopic resistance.

The resin binder composition of the present invention may further contain a polyester resin B having a softening point lower than the polyester resin A.

A difference in the softening points between the polyester resin A and the polyester resin B is preferably 10° C. or more, more preferably 15° C. or more, and even more preferably 20° C. or more, and preferably 65° C. or less, more preferably 60° C. or less, and even more preferably 55° C. or less.

The polyester resin B is a polycondensate of an alcohol containing a dihydric or higher polyhydric alcohol and a carboxylic acid component containing a dicarboxylic or higher polycarboxylic acid compound, in which the carboxylic acid component preferably containing the above acid modified product A, wherein the acid modified product A used in the polyester resin A and the polyester resin B may be identical or different. Specific examples of the alcohol component and the carboxylic acids are the same as those of the polyester resin A. In addition, it is preferable that the polyester resin B is an amorphous resin, in the same manner as in the polyester resin A.

Here, the content of the tricarboxylic acid compound in the carboxylic acid component of the amorphous polyester resin AL is preferably 5% by mol or less, more preferably 3% by mol or less, and even more preferably 0% by mol.

The softening point of the polyester resin B is preferably 80° C. or higher, and more preferably 85° C. or higher, from the viewpoint of storage property, and the softening point is preferably 110° C. or lower, more preferably 105° C. or lower, and even more preferably 100° C. or lower, from the viewpoint of low-temperature fusing ability.

The glass transition temperature of the polyester resin B is preferably 45° C. or higher, from the viewpoint of storage stability, and the glass transition temperature is preferably 80° C. or lower, more preferably 70° C. or lower, and even more preferably 60° C. or lower, from the viewpoint of low-temperature fusing ability.

The acid value of the polyester resin B is preferably 1 mgKOH/g or more, and more preferably 3 mgKOH/g or more, from the viewpoint of low-temperature fusing ability, and the acid value is preferably 15 mgKOH/g or less, more preferably 10 mgKOH/g or less, and even more preferably 5 mgKOH/g or less, from the viewpoint of hygroscopic resistance.

The mass ratio of the polyester resin A to the polyester resin B (polyester resin A/polyester resin B) is preferably 60/40 or more, and more preferably 70/30 or more, and preferably 95/5 or less, and more preferably 90/10 or less.

The resin binder composition of the present invention may contain a polyester resin other than the polyester resin A and the polyester resin B, a vinyl-based resin such as a styrene-acrylic resin, an epoxy resin, a polycarbonate, a polyurethane, a composite resin containing two or more kinds of these resins, and the like. The polyester resin A, or a total content of the polyester resin A and the polyester resin B when the polyester resin B is contained, in the resin binder composition is preferably 80% by mass or more, more preferably 90% by mass or more, even more preferably 95% by mass or more, and even more preferably 100% by mass.

The content of the resin binder composition of the present invention in the toner for electrostatic image development is preferably 50% by mass or more, more preferably 60% by mass or more, even more preferably 70% by mass or more, and even more preferably 80% by mass, and preferably less than 100% by mass, more preferably 98% by mass or less, even more preferably 95% by mass or less, and even more preferably 92% by mass or less.

The toner for electrostatic image development of the present invention may contain, besides a resin binder (a resin binder composition of the present invention), an additive such as a colorant, a releasing agent, a charge control agent, a magnetic powder, a flowability improver, an electric conductivity modifier, a reinforcing filler such as a fibrous material, an antioxidant, or a cleanability improver, and preferably contains a colorant, a releasing agent, and a charge control agent.

As the colorant, dyes, pigments, magnetic powder, and the like which are used as colorants for toners can be used. Examples include carbon blacks, Phthalocyanine Blue, Permanent Brown FG, Brilliant Fast Scarlet, Pigment Red 122, Pigment Green B, Rhodamine-B Base, Solvent Red 49, Solvent Red 146, Solvent Blue 35, quinacridone, carmine 6B, isoindoline, disazo yellow, and the like. In the present invention, the toners may be any one of black toners and color toners.

From the viewpoint of improving optical density and low-temperature fusing ability of the toner, the content of the colorant, based on 100 parts by mass of the resin binder, is preferably 1 part by mass or more, and more preferably 2 parts by mass or more, and the content is preferably 40 parts by mass or less, and more preferably 10 parts by mass or less.

The releasing agent (wax) includes aliphatic hydrocarbon waxes such as polypropylene wax, polyethylene wax, polypropylene-polyethylene copolymer wax, microcrystalline wax, paraffin waxes, Fischer-Tropsch wax, and sazole wax or oxides thereof; ester-based waxes such as carnauba wax, montan wax or deacidified waxes thereof, and fatty acid ester waxes; fatty acid amides, fatty acids, higher alcohols, metal salts of fatty acids, and the like. These releasing agents can be used alone or in a mixture of two or more kinds.

The melting point of the releasing agent is preferably 80° C. or higher, more preferably 85° C. or higher, and even more preferably 90° C. or higher, from the viewpoint of transferability of the toner, and the melting point is preferably 130° C. or lower, more preferably 125° C. or lower, and even more preferably 120° C. or lower, from the viewpoint of low-temperature fusing ability.

From the viewpoint of low-temperature fusing ability and offset resistance of the toner and from the viewpoint of dispersibility in the resin binder, the content of the releasing agent, based on 100 parts by mass of the resin binder, is preferably 0.5 parts by mass or more, more preferably 1 part by mass or more, even more preferably 1.5 parts by mass or more, even more preferably 3 parts by mass or more, and even more preferably 4 parts by mass or more, and the content is preferably 10 parts by mass or less, more preferably 8 parts by mass or less, and even more preferably 7 parts by mass or less.

The charge control agent may contain, but not particularly limited to, any of positively chargeable charge control agents and negatively chargeable charge control agents.

The positively chargeable charge control agent includes Nigrosine dyes, for example, "Nigrosine Base EX," "OIL BLACK BS," "OIL BLACK SO," "BONTRON N-01," "BONTRON N-04," "BONTRON N-07," "BONTRON N-09," "BONTRON N-11" (hereinabove manufactured by Orient Chemical Industries Co., Ltd.), and the like; triphenylmethane-based dyes containing a tertiary amine as a side chain; quaternary ammonium salt compounds, for example, "BONTRON P-51" (manufactured by Orient Chemical Industries Co., Ltd.), cetyltrimethylammonium bromide, "COPY CHARGE PX VP435" (manufactured by Clariant, Ltd.), and the like; polyamine resins, for example, "AFP-B" (manufactured by Orient Chemical Industries Co., Ltd.), and the like; imidazole derivatives, for example, "PLZ-2001," "PLZ-8001" (hereinabove manufactured by Shikoku Chemicals Corporation), and the like; styrene-acrylic resins, for example, "FCA-701PT" (manufactured by FUJIKURAKASEI CO., LTD.), and the like.

In addition, the negatively chargeable charge control agent includes metal-containing azo dyes, for example, "VARIFAST BLACK 3804," "BONTRON S-31," "BONTRON S-32," "BONTRON S-34," "BONTRON S-36" (hereinabove manufactured by Orient Chemical Industries Co., Ltd.), "AIZEN SPILON BLACK TRH," "T-77" (manufactured by Hodogaya Chemical Co., Ltd.), and the like; metal compounds of benzilic acid compounds, for example, "LR-147," "LR-297" (hereinabove manufactured by Japan Carlit Co., Ltd.), and the like; metal compounds of salicylic acid compounds, for example, "BONTRON E-81," "BONTRON E-84," "BONTRON E-88," "BONTRON E-304" (hereinabove manufactured by Orient Chemical industries Co., Ltd.), "TN-105" (manufactured by Hodogaya Chemical Co., Ltd.), and the like; copper phthalocyanine dyes; quaternary ammonium salts, for example, "COPY CHARGE NX VP434" (manufactured by Clariant, Ltd.), nitroimidazole derivatives, and the like; organometallic compounds and the like.

From the viewpoint of electric stability of the toner, the content of the charge control agent, based on 100 parts by mass of the resin binder, is preferably 0.01 parts by mass or more, and more preferably 0.2 parts by mass or more, and preferably 10 parts by mass or less, more preferably 5 parts by mass or less, even more preferably 3 parts by mass or less, and even more preferably 2 parts by mass or less.

The toner of the present invention may be a toner obtained by any of the conventionally known methods such as a melt-kneading method, an emulsion phase-inversion method, and a polymerization method, and a pulverized toner produced by the melt-kneading method is preferred, from the viewpoint of productivity and dispersibility of a colorant. In a case of a pulverized toner produced by a melt-kneading method, a toner can be produced by homogeneously mixing raw materials such as a resin binder, a colorant, a releasing agent and a charge control agent with a mixer such as a Henschel mixer, thereafter melt-kneading the mixture with a closed kneader, a single-screw or twin-screw extruder, an open-roller type kneader or the like, cooling, pulverizing, and classifying the product.

In the toner of the present invention, an external additive is preferably used, for the purpose of improving transferability. The external additive includes fine inorganic particles of silica, alumina, titania, zirconia, tin oxide, zinc oxide, and the like, and fine organic particles of resin particles such as fine melamine resin particles and fine polytetrafluoroethylene resin particles. Two or more kinds of the external additives may be used in combination. Among them, silica is preferred, and a hydrophobic silica that is hydrophobically treated is more preferred, from the viewpoint of transferability of the toner.

The hydrophobic treatment agent for hydrophobically treating the surface of silica particles includes hexamethyldisilazane (IIMDS), dimethyldichlorosilane (DMDS), a silicone oil, octyltriethoxysilane (OTES), methyltriethoxysilane, and the like.

From the viewpoint of chargeability, flowability, and transferability of the toner, the average particle size of the external additive is preferably 10 nm or more, and more preferably 15 nm or more, and preferably 250 nm or less, more preferably 200 nm or less, even more preferably 150 nm or less, and even more preferably 90 nm or less.

From the viewpoint of chargeability, flowability, and transferability of the toner, the content of the external additive, based on 100 parts by mass of the toner before the treatment with the external additive, is preferably 0.05 parts by mass or more, more preferably 0.1 parts by mass or more, and even more preferably 0.3 parts by mass or more, and the content is preferably 5 parts by mass or less, and more preferably 3 parts by mass or less.

The volume-median particle size $D_{50}$ of the toner of the present invention is preferably 3 μm or more, and more preferably 4 μm or more, and preferably 15 μm or less, and more preferably 10 μm or less. The volume-median particle size $D_{50}$ as used herein means a particle size of which cumulative volume frequency calculated on a volume percentage is 50% counted from the smaller particle sizes. Also, in a case where the toner is treated with an external additive, the volume-median particle size of the toner is regarded as a volume-median particle size of the toner particles before the treatment with an external additive.

The toner of the present invention can be used as a toner for monocomponent development, or a toner may be mixed with a carrier to be used as a two-component developer.

The present invention will be described more specifically by means of Examples, without intending to limit the present invention thereto. The physical properties of the resins and the like can be measured in accordance with the following methods.

[Highest Temperature of Endothermic Peak of Acid Modified Product]

Using a differential scanning calorimeter "DSC Q20," manufactured by TA Instruments Japan, a 0.01 to 0.02 g sample is weighed out in an aluminum pan, heated from room temperature (25° C.) to 200° C. at a heating rate of 10° C./min, and cooled from that temperature to −10° C. at a cooling rate of 5° C./min. Next, the temperature of the sample is raised to 180° C. at a heating rate of 10° C./min to measure endothermic peaks. One in which a highest temperature of endothermic peak is not detected is amorphous, and when detected, a softening point is measured in the same manner as that of the resin, and a crystallinity index (softening point/highest temperature of endothermic peak) is calculated to be judged.

[Weight-Average Molecular Weight (Mw) of Acid Modified Product of α-Olefin Polymer]

(1) Preparation of Sample Solution

A sample is dissolved in tetrahydrofuran so as to have a concentration of 0.5 g/100 mL. Next, this solution is filtered with a fluororesin filter "FP-200," manufactured by Sumitomo Electric Industries, Ltd., having a pore size of 2 µm, to remove insoluble components, to provide a sample solution.

(2) Measurement of Molecular Weight Distribution

Using the following measurement apparatus and analyzing column, the measurement is taken by allowing tetrahydrofuran to flow through a column as an eluent at a flow rate of 1 mL per minute, and stabilizing the column in a thermostat at 40° C. A 100 µL of a sample solution is injected thereto to take measurements. The molecular weight of the sample is calculated based on the previously drawn calibration curve. At this time, a calibration curve which is drawn from several kinds of monodispersed polystyrenes, manufactured by Tosoh Corporation, A-500 (Mw $5.0\times10^2$), A-1000 (Mw $1.01\times10^3$), A-2500 (Mw $2.63\times10^3$), A-5000 (Mw $5.97\times10^3$), F-1 (Mw $1.02\times10^4$), F-2 (Mw $1.81\times10^4$), F-4 (Mw $3.97\times10^4$), F-10 (Mw $9.64\times10^4$), F-20 (Mw $1.90\times10^5$), F-40 (Mw $4.27\times10^5$), F-80 (Mw $7.06\times10^5$), and F-128 (Mw $1.09\times10^6$) as standard samples is used. The values within parentheses show molecular weights.

Measurement Apparatus: HLC-8220GPC, manufactured by Tosoh Corporation

Analyzing Column: GMHXL+G3000HXL, manufactured by Tosoh Corporation.

[Softening Point of Resin]

Using a flow tester "CFT-500D," manufactured by Shimadzu Corporation, a 1 g sample is extruded through a nozzle having a diameter of 1 mm and a length of 1 mm with applying a load of 1.96 MPa thereto with a plunger, while heating the sample at a heating rate of 6° C./min. The softening point refers to a temperature at which half of the sample flows out, when plotting a downward movement of the plunger of the flow tester against temperature.

[Highest Temperature of Endothermic Peak of Resin]

Using a differential scanning calorimeter "Q-100," manufactured by TA Instruments, Japan, a 0.01 to 0.02 g sample is weighed out in an aluminum pan, and cooled from room temperature (25° C.) to 0° C. at a cooling rate of 10° C./min, and kept at 0° C. for one minute. Thereafter, the temperature of the sample is raised at a heating rate of 10° C./min to take measurements. Of the endothermic peaks observed, a temperature of the peak at the highest temperature is defined as a highest temperature of endothermic peak.

[Glass Transition Temperature of Resin]

Measurements are taken using a differential scanning calorimeter "Q-100" (manufactured by TA Instruments, Japan), by weighing out a 0.01 to 0.02 g sample in an aluminum pan, heating the sample to 200° C., and cooling the sample from that temperature to 0° C. at a cooling rate of 10° C./min. Next, the sample is heated at a rate of 10° C./min to take measurements of endothermic peaks. A temperature of an intersection of the extension of the baseline of equal to or lower than the highest temperature of endothermic peak and the tangential line showing the maximum inclination between the kick-off of the peak and the top of the peak in the above measurement is defined as a glass transition temperature.

[Acid Value of Resin]

The acid value is determined by a method according to JIS K0070:1992 except that only the determination solvent is changed from a mixed solvent of ethanol and ether as prescribed in JIS K0070 to a mixed solvent of acetone and toluene in a volume ratio of acetone:toluene=1:1.

[Melting Point of Releasing Agent]

Using a differential scanning calorimeter "DSC Q-100," manufactured by TA Instruments Japan, a 0.01 to 0.02 g sample is weighed out in an aluminum pan, heated to 200° C. at a heating rate of 10° C./min, and cooled from that temperature to −10° C. at a cooling rate of 5° C./min. Next, the temperature of the sample is raised to 180° C. at a heating rate of 10° C./min to take measurements. A highest temperature of endothermic peak observed from a melting-endothermic curve obtained above is defined as a melting point of a releasing agent.

[Average Particle Size of External Additive]

The average particle size refers to a number-average particle size, which is defined as a number-average of particle sizes (average of length and breadth) determined for 500 particles from a photograph taken with a scanning electron microscope (SEM).

[Volume-Median Particle Size of Toner]

Measuring Apparatus: Coulter Multisizer II, manufactured by Beckman Coulter, Inc.

Aperture Diameter: 50 µm

Analyzing Software: Coulter Multisizer AccuComp Ver. 1.19, manufactured by Beckman Coulter, Inc.

Electrolytic Solution: Isotone II, manufactured by Beckman Coulter, Inc.

Dispersion: EMULGEN 109P, manufactured by Kao Corporation, polyoxyethylene lauryl ether, HLB (Griffin): 13.6, is dissolved in the electrolytic solution to adjust to a concentration of 5% by mass to provide a dispersion.

Dispersion Conditions: Ten milligrams of a measurement sample is added to 5 mL of the above dispersion, and the mixture is dispersed for 1 minute with an ultrasonic disperser (name of machine: US-1, manufactured by SND Co., Ltd., output: 80 W). Thereafter, 25 mL of the above electrolytic solution is added to the dispersion, and further dispersed with the ultrasonic disperser for 1 minute, to prepare a sample dispersion.

Measurement Conditions: The above sample dispersion is added to 100 mL of the above electrolytic solution to adjust to a concentration at which particle sizes of 30,000 particles can be measured in 20 seconds, and the 30,000 particles are measured, and a volume-median particle size $D_{50}$ is obtained from the particle size distribution.

Production Example 1 of Resin

A 10-liter four-neck flask equipped with a dehydration tube equipped with a nitrogen inlet tube, a stirrer, and a thermocouple was charged with an alcohol component as listed in Table 1. The contents were heated to 100° C., terephthalic acid as listed in Table 1 was then added thereto, and the mixture was heated to 130° C. An esterification catalyst and an esterification promoter as listed in Table 1 were added thereto, the mixture was heated to 185° C. and reacted at 185° C. for 5 hours, and the mixture was then stepwise heated to 220° C. at a rate of 5° C./h. After having confirmed that the reaction percentage reached 90% or more at 220° C., the reaction mixture was cooled to 160° C., and an acid modified product as listed in Table 1 was added thereto. The reaction mixture was then heated again to 220° C., and subjected to a polycondensation reaction at 220° C. for 5 hours. Thereafter, the reaction mixture was cooled to 200° C., trimellitic anhydride as listed in Table I was added thereto, and the reaction mixture was subjected to a polycondensation reaction at 200° C. for 1 hour, and further cooled to 200° C., and reacted at 200° C. and 8.0 kPa until a softening point reached to a value as listed in Table 1, to provide each of amorphous polyester resins (resins A1 to A6).

Production Example 2 of Resin

A 10-liter four-neck flask equipped with a dehydration tube equipped with a nitrogen inlet tube, a stirrer, and a thermocouple was charged with an alcohol component as listed in Table 2. The contents were heated to 100° C., terephthalic acid as listed in Table 2 was then added thereto, and the mixture was heated to 130° C. An esterification catalyst and an esterification promoter as listed in Table 2 were added thereto, the mixture was heated to 185° C. and reacted at 185° C. for 5 hours, and the mixture was then stepwise heated to 220° C. at a rate of 5° C./h. After having confirmed that the reaction percentage reached 90% or more at 220° C., the reaction mixture was cooled to 160° C., and an acid modified product as listed in Table 2 was added thereto. The reaction mixture was then heated again to 220° C., and subjected to a polycondensation reaction at 220° C. for 5 hours. The reaction mixture was further cooled to 200° C., and reacted at 200° C. and 8.0 kPa until a softening point reached to a value as listed in Table 2, to provide each of amorphous polyester resins (resins B1, B4). Here, the reaction percentage refers to a value calculated by:

[amount of generated water in reaction/theoretical amount of generated water]×100.

Production Example 3 of Resin

A 10-liter four-neck flask equipped with a dehydration tube equipped with a nitrogen inlet tube, a stirrer, and a thermocouple was charged with an alcohol component as listed in Table 2. The contents were heated to 100° C., terephthalic acid as listed in Table 2 was then added thereto, and the mixture was heated to 130° C. An esterification catalyst and an esterification promoter as listed in Table 2 were added thereto, the mixture was heated to 185° C. and reacted at 185° C. for 5 hours, and the mixture was then stepwise heated to 220° C. at a rate of 5° C./h. After having confirmed that the reaction percentage reached 90% or more at 220° C., the reaction mixture was reacted at 220° C. and 8.0 kPa until a softening point reached to a value as listed in Table 2, to provide an amorphous polyester resin (resin B2).

Production Example 4 of Resin

A 10-liter four-neck flask equipped with a dehydration tube equipped with a nitrogen inlet tube, a stirrer, and a thermocouple was charged with an alcohol component as listed in Table 2. The contents were heated to 100° C., terephthalic acid as listed in Table 2 was then added thereto, and the mixture was heated to 130° C. An esterification catalyst and an esterification promoter as listed in Table 2 were added thereto, the mixture was heated to 185° C. and reacted at 185° C. for 5 hours, and the mixture was then stepwise heated to 220° C. at a rate of 5° C./h. After having confirmed that the reaction percentage reached 90% or more at 220° C., the reaction mixture was cooled to 200° C., and an alkenylsuccinic anhydride substituted with an alkenyl group having from 10 to 14 carbon atoms as listed in Table 2 was added thereto, and the reaction mixture was subjected to a polycondensation reaction at 200° C. for 1 hour. The reaction mixture was further reacted at 200° C. and 8.0 kPa until a softening point reached to a value as listed in Table 2, to provide an amorphous polyester resin (resin B3).

TABLE 1

| | | Resin A1 | | Resin A2 | | Resin A3 | | Resin A4 | | Resin A5 | | Resin A6 | |
|---|---|---|---|---|---|---|---|---|---|---|---|---|---|
| | | g | ratio | g | ratio | g | ratio | g | ratio | g | ratio | g | ratio |
| Alcohol component | Ethylene glycol | 770 | 35 | 729 | 35 | 689 | 35 | 648 | 35 | 567 | 35 | 689 | 35 |
| | Neopentyl glycol | 2397 | 65 | 2271 | 65 | 2147 | 65 | 2019 | 65 | 1766 | 65 | 2147 | 65 |
| Carboxylic acid component A | Terephthalic acid | 3885 | 66 | 3681 | 66 | 3479 | 66 | 3272 | 66 | 2863 | 66 | 3479 | 66 |
| | Trimellitic anhydride | 1498 | 22 | 1419 | 22 | 1335 | 22 | 1261 | 22 | 1104 | 22 | 1335 | 22 |
| Carboxylic acid component B (acid modified product) | PIBSA[1] | 393 | 4.6 | 786 | 9.7 | 1180 | 15.4 | 1573 | 21.8 | 2359 | 37.4 | — | — |
| | PP/PE-g-MA[2] | — | — | — | — | — | — | — | — | — | — | 1180 | 15.4 |
| Esterification catalyst | Tin(II) 2-ethylhexanoate | 42.8 | 0.5 | 40.5 | 0.5 | 38.3 | 0.5 | 36.0 | 0.5 | 31.5 | 0.5 | 38.3 | 0.5 |
| Esterification promoter | Gallic acid | 1.7 | 0.02 | 1.6 | 0.02 | 1.5 | 0.02 | 1.4 | 0.02 | 1.2 | 0.02 | 1.5 | 0.02 |
| Physical properties | Softening point, ° C. | 135.9 | | 135.7 | | 137.1 | | 136.6 | | 135.9 | | 135.8 | |
| | Highest temperature of endothermic peak, ° C. | 67.7 | | 65.7 | | 65.3 | | 63.8 | | 62.4 | | 65.8 | |
| | Softening point/highest temperature of endothermic peak | 2.01 | | 2.07 | | 2.10 | | 2.14 | | 2.18 | | 2.06 | |
| | Glass transition temperature, ° C. | 65.1 | | 63.9 | | 62.4 | | 61.1 | | 59.8 | | 63.6 | |
| | Acid value, mgKOH/g | 35.1 | | 37.6 | | 40.7 | | 43.7 | | 46.9 | | 39.1 | |

Note)
Ratios of the alcohol component and the carboxylic acid component A are each expressed by a molar ratio, ratios of the carboxylic acid component B are expressed by a mass ratio based on 100 parts by mass of a total of the alcohol component and the carboxylic acid component A, and ratios of the esterification catalyst and the esterification promoter are each expressed by a mass ratio, based on 100 parts by mass of a total of the alcohol component and the carboxylic acid component A, respectively.
[1]PIBSA: an amorphous one-end modified polyisobutene succinic anhydride "H1000," manufactured by Dover, Mw: 2400, highest temperature of endothermic peak: not detected
[2]PP/PE-g-MA: a crystalline randomly grafted maleic anhydride-modified ethylene/propylene copolymer "TOYO-TAC PMA-T," manufactured by TOYOBO CO., LTD, softening point (98° C.)/highest temperature of endothermic peak (93° C.) = 1.05

TABLE 2

|  |  | Resin B1 |  | Resin B2 |  | Resin B3 |  | Resin B4 |  |
| --- | --- | --- | --- | --- | --- | --- | --- | --- | --- |
|  |  | g | ratio | g | ratio | g | ratio | g | ratio |
| Alcohol component | 1,2-Propanediol | 2785 | 100 | 3276 | 100 | 2747 | 100 | 2785 | 100 |
| Carboxylic acid component A | Terephthalic acid | 4866 | 80 | 5724 | 80 | 4800 | 80 | 4866 | 80 |
|  | Alkenylsuccinic anhydride | — | — | — | — | 1453 | 15 | — | — |
| Carboxylic acid component B (acid modified product) | PIBSA[1] | 1171 | 15.3 | — | — | — | — | — | — |
|  | PP/PE-g-MA[2] | — | — | — | — | — | — | 1171 | 15.3 |
| Esterification catalyst | Tin(II) 2-ethylhexanoate | 38.3 | 0.5 | 45.0 | 0.5 | 45.0 | 0.5 | 38.3 | 0.5 |
| Esterification promoter | Gallic acid | 1.5 | 0.02 | 4.5 | 0.02 | 4.5 | 0.02 | 1.5 | 0.02 |
| Physical properties | Softening point, °C. |  | 91.2 |  | 90.7 |  | 92.4 |  | 90.5 |
|  | Highest temperature of endothermic peak, °C. |  | 48.9 |  | 52.4 |  | 47.0 |  | 50.5 |
|  | Softening point/highest temperature of endothermic peak |  | 1.87 |  | 1.73 |  | 1.97 |  | 1.79 |
|  | Glass transition temperature, °C. |  | 46.9 |  | 50.5 |  | 44.4 |  | 48.1 |
|  | Acid value, mgKOH/g |  | 4.2 |  | 4.5 |  | 2.9 |  | 4.7 |

Note)
Ratios of the alcohol component and the carboxylic acid component A are each expressed by a molar ratio; ratios of the carboxylic acid component B are expressed by a mass ratio based on 100 parts by mass of a total of the alcohol component and the carboxylic acid component A, and ratios of the esterification catalyst and the esterification promoter are each expressed by a mass ratio, based on 100 parts by mass of a total of the alcohol component and the carboxylic acid component A, respectively.
[1]PIBSA: an amorphous one-end modified polyisobutene succinic anhydride "H1000," manufactured by Dover, Mw: 2400, highest temperature of endothermic peak: not detected
[2]PP/PE-g-MA: a crystalline randomly grafted maleic anhydride-modified ethylene/propylene copolymer "TOYO-TAC PMA-T," manufactured by TOYOBO CO., LTD, softening point (98° C.)/highest temperature of endothermic peak (93° C.) = 1.05

Examples 1 to 7 and Comparative Examples 1 to 3

One-hundred parts by mass of a resin binder as listed in Table 3, 6 parts by mass of a colorant "Fastogen Supermagenda R" (C.I. Pigment Red 122, manufactured by Dainippon Ink and Chemicals Incorporated), 1 part by mass of a charge control agent "LR-147" manufactured by Japan Carlit Co., Ltd., and 4 parts by mass of a releasing agent "SP-105" manufactured by S. Kato & CO., Fischer-Tropsch wax, melting point: 105° C. were thoroughly stirred with a Henschel mixer. Thereafter, the mixture was melt-kneaded with a co-rotating twin-screw extruder of which kneading member had a full length of 1560 mm, a diameter of screw of 42 mm, and an inner diameter of barrel of 43 mm. The rotational speed of the roller was 200 r/min, and a heating set temperature within the roller was 100° C., the temperature of the kneaded product was 160° C., the feeding rate of the kneaded product was 10 kg/h, and the average residence time was about 18 seconds. After cooling, toner particles having a volume-median particle size $D_{50}$ of 6.5 μm were obtained with a jet mill.

To 100 parts by mass of the toner particles obtained was added 2 parts by mass of a hydrophobic silica "Aerosil R972" manufactured by Nippon Aerosil Co., Ltd., hydrophobic treatment agent: DMDS, average particle size: 16 nm as an external additive, and the mixture was mixed with a Henschel mixer at 3,600 r/min for 5 minutes to carry out an external additive treatment, to provide each of the toners.

Test Example 1—Low-Temperature Fusing Ability

Each of the toner was loaded to a color printer manufactured by Oki Data Corporation under the trade name of "C612dnw," and an image was printed out in an unfused state (print coverage area: 6 cm x 6 cm, 0.5 mg/cm$^2$).

An unfused image was allowed to fuse with a fusing device of the above printer offline at 100 mm/sec with raising the temperature from 100° C. with an increment of 5° C. Here, as a paper to be fused, J sheet manufactured by Fuji Xerox, a basis weight: 82 g/m$^2$, and a paper thickness: 97 μm was used.

"UNICEF Cellophane" tape, MITSUBISHI PENCIL CO., LTD., width: 18 mm, JIS Z-1522, was adhered to the fused images, and the resulting fused images were allowed to pass through a fusing roller set at 30° C., and the tape was then removed. The optical reflective densities of the image before adhesion of the tape and after removal of the tape were measured with a reflective densitometer "RD-915" manufactured by Macbeth Process Measurements Co. The temperature of a fusing roller at which the percentage of the optical reflective densities (after removal of the tape/before adhesion of the tape) initially exceeds 90% is defined as the lowest fusing temperature, and the low-temperature fusing ability was evaluated. The results are shown in Table 3.

Test Example 2—Hygroscopic Resistance

The particle sizes of the resin used in a resin binder were evenly sized to from 150 to 250 μm, and the resin was dried for 12 hours with a vacuum dryer at 40° C. and 60 Torr. The mass thereof after drying (resin mass a) was measured. The amount 2.00 g of a dried resin was evenly spread over a glass petri dish, and allowed to stand for 12 hours under high-temperature, high-humidity environmental conditions of 40° C. and a humidity of 85%, and the mass was then again measured (resin mass b).

The smaller the hygroscopicity ratio (%) calculated from (Resin mass $b$–Resin mass $a$)/Resin mass $a$×100, the more excellent the hygroscopic resistance, and the hygroscopic resistance was evaluated in accordance with the following evaluation criteria. The results are shown in Table 3.
<Evaluation Criteria>
A: A hygroscopicity ratio is less than 0.50%, so that the chargeability of the toner is not affected thereby.

B: A hygroscopicity ratio is 0.50% or more and less than 0.60%, so that there is a possibility of slightly lowering the chargeability.

C: A hygroscopicity ratio is 0.60% or more and less than 0.90%, so that there is a possibility of lowering the chargeability of the toner.

D: A hygroscopicity ratio is 0.90% or more, so that there is a high possibility of lowering the chargeability of the toner, or the chargeability of the toner is lowered, thereby giving causations to development failures.

Test Example 3—Initial Rise in Charging

A 20 mL polypropylene bottle was charged with 4 parts by mass (0.4 g) of a toner and 96 parts by mass (9.6 g) of a silicone-coated ferrite carrier manufactured by KANTO DENKA KOGYO CO., LTD. (average particle size: 90 μm), under the environmental conditions of a temperature of 25° C. and a relative humidity of 50%, and the components were mixed with a ball-mill for 0.5 minutes, and electric charges of the toner were determined with a "q/m Meter MODEL 210HS" manufactured by TREK. Subsequently, the contents were stirred for additional 2.5 minutes, and electric charges were determined. A value of a ratio of two electric charges (electric charges at 0.5 minutes/electric charges at 2.5 minutes) was calculated. The larger the calculated value, the more excellent the initial rise in charging. The initial rise in charging was evaluated in accordance with the following evaluation criteria. The results are shown in Table 3.

<Evaluation Criteria>

A: A calculated value is 0.60 or more, so that printing failure due to development failure is not generated even when printed at high speeds (50 sheets or more), or there is a slight possibility that printing failure due to development failure is generated when printed at high speeds.

B: A calculated value is 0.40 or more and less than 0.60, so that printing failure due to development failure is generated when printed at high speeds.

C: A calculated value is less than 0.40, so that printing cannot be carried out due to development failure when printed at high speeds.

Test Example 4—Storage Property

A cylindrical vessel was charged with 5 g of a toner, and the content was allowed to stand under high-temperature environmental conditions of a temperature of 50° C. and a relative humidity of 50% for 72 hours. Thereafter, the toner was sieved with a sieve having a size of 200 mesh (sieve opening: 75 μm), and the mass of the toner passing through the sieve was weighed. The larger the mass of the toner passing through, the more excellent the storage property. The storage property was evaluated in accordance with the following evaluation criteria. The results are shown in Table 3.

<Evaluation Criteria>

A: The toner passing through the sieve is 80% by mass or more, so that the printing failure due to aggregation of the toner is not generated, or there is a slight possibility that printing failure due to aggregation of the toner is generated.

B: The toner passing through the sieve is 20% by mass or more and less than 80% by mass, so that there is a high possibility that printing failure due to aggregation of the toner is generated.

C: The toner passing through the sieve is less than 20% by mass, so that printing failure due to aggregation of the toner is generated.

TABLE 3

| | Resin Binder | | Evaluations of Toner | | | | | |
|---|---|---|---|---|---|---|---|---|
| | Kind | Parts by mass | Low-temperature fusing ability, ° C. | Hygroscopic resistance | | Initial rise in charging | | Storage property |
| Ex. 1 | Resin B1 | 100 | 150 | B | 0.56% | A | 0.62 | A 81% |
| Ex. 2 | Resin A1 | 100 | 160 | A | 0.49% | A | 0.65 | A 86% |
| Ex. 3 | Resin A2 | 100 | 160 | A | 0.48% | A | 0.68 | A 84% |
| Ex. 4 | Resin A3 | 100 | 160 | A | 0.45% | A | 0.72 | A 84% |
| Ex. 5 | Resin A4 | 100 | 160 | A | 0.41% | A | 0.75 | A 83% |
| Ex. 6 | Resin A5 | 100 | 160 | A | 0.38% | A | 0.76 | A 82% |
| Ex. 7 | Resin A3 | 80 | 155 | A | 0.46% | A | 0.71 | A 81% |
| | Resin B1 | 20 | | | | | | |
| Comp. Ex. 1 | Resin B2 | 100 | 150 | D | 1.13% | C | 0.32 | A 86% |
| Comp. Ex. 2 | Resin B3 | 100 | 150 | C | 0.88% | B | 0.51 | C 34% |
| Comp. Ex. 3 | Resin A6 | 80 | 155 | C | 0.80% | C | 0.38 | A 84% |
| | Resin B4 | 20 | | | | | | |

It can be seen from the above results that the toners of Examples 1 to 7 are excellent in all of hygroscopic resistance, initial rise in charging, and storage property, while maintaining favorable low-temperature fusing ability.

On the other hand, the toner of Comparative Example 1 containing a polyester resin without using an acid modified product has low hygroscopic resistance, and is more likely to leak electric charges, so that the toner is deficient in the initial rise in charging. In addition, the toner of Comparative Example 2 containing a polyester resin in which an amorphous monomer having a hydrophobic alkyl group (alkenylsuccinic anhydride) is used in place of the acid modified product has worsened storage property due to the lowering of the glass transition temperature of the resin even though the hygroscopic resistance and the initial rise in charging are improved as compared to those of Comparative Example 1. In addition, the toner of Comparative Example 3 containing a polyester resin using a crystalline macromer having a hydrophobic alkyl group such as an acid modified product of an α-olefin polymer having 2 or 3 carbon atoms is deficient in initial rise in charging and hygroscopic resistance, as compared to those of Example 7.

The resin binder composition for toners of the present invention is suitably used for a toner for electrostatic image development which is usable in development of latent images formed in, for example, electrostatic image development method, electrostatic recording method, electrostatic printing method or the like.

The invention claimed is:

1. A toner for electrostatic image development, comprising:
 a resin binder composition, comprising:
  a polyester resin A that is a polycondensate of an alcohol component comprising 80% by mol or more of an aliphatic diol having from 2 to 6 carbon atoms and a carboxylic acid component comprising an aromatic dicarboxylic acid compound and an amorphous acid modified product A of an α-olefin polymer having from 4 to 18 carbon atoms,
 wherein the α-olefin polymer having from 4 to 18 carbon atoms is a polyisobutene-based polymer.

2. The toner for electrostatic image development according to claim 1, wherein the polyester resin A is a polycondensate of a polycondensate of an alcohol component comprising 80% by mol or more of an aliphatic diol having from 2 to 6 carbon atoms and a carboxylic acid component other than the amorphous acid modified product A of an α-olefin polymer having from 4 to 18 carbon atoms, with the acid modified product A.

3. The toner for electrostatic image development according to claim 1, wherein a weight-average molecular weight of the amorphous acid modified product A of an α-olefin polymer having from 4 to 18 carbon atoms is from 500 to 5,000.

4. The toner for electrostatic image development according to claim 1, wherein the amorphous acid modified product A of an α-olefin polymer having from 4 to 18 carbon atoms is an acid modified product in which the α-olefin polymer having from 4 to 18 carbon atoms is modified with at least one acid selected from the group consisting of maleic acid, fumaric acid, itaconic acid, and anhydrides of these acids.

5. The toner for electrostatic image development according to claim 1, wherein the amorphous acid modified product A of an α-olefin polymer having from 4 to 18 carbon atoms is an acid modified product in which an end or ends of the α-olefin polymer having from 4 to 18 carbon atoms are modified with an acid.

6. The toner for electrostatic image development according to claim 1, wherein the amorphous acid modified product A of an α-olefin polymer having from 4 to 18 carbon atoms is an acid modified product in which one end of the α-olefin polymer having from 4 to 18 carbon atoms is modified with an acid.

7. The toner for electrostatic image development according to claim 1, wherein the aliphatic diol having from 2 to 6 carbon atoms is one or more selected from the group consisting of ethylene glycol, 1,2-propanediol, and neopentyl glycol.

8. The toner for electrostatic image development according to claim 1, wherein the content of the amorphous acid modified product A of an α-olefin polymer having from 4 to 18 carbon atoms is from 3 parts by mass to 40 parts by mass, based on 100 parts by mass of a total amount of the alcohol component and the carboxylic acid component other than the acid modified product A.

9. The toner for electrostatic image development according to claim 1, wherein the amorphous acid modified product A of the α-olefin polymer having from 4 to 18 carbon atoms is a polyisobutene succinic anhydride modified with maleic anhydride at one end.

10. The toner for electrostatic image development according to claim 1, wherein the aliphatic diol having from 2 to 6 carbon atoms comprises ethylene glycol and neopentyl glycol.

11. The toner for electrostatic image development according to claim 10, wherein a molar ratio of ethylene glycol to neopentyl glycol (ethylene glycol/neopentyl glycol) is from 15/85 to 60/40.

12. The toner for electrostatic image development according to claim 1, wherein the aromatic dicarboxylic acid compound comprises terephthalic acid.

13. The toner for electrostatic image development according to claim 1, wherein the softening point of the polyester resin A is from 90° C. to 160° C.

14. The toner for electrostatic image development according to claim 1, wherein the content of the polyester resin A in the resin binder composition is 80% by mass or more.

15. The toner for electrostatic image development according to claim 1, wherein the content of the resin binder composition in the toner is from 50% by mass to less than 100% by mass.

16. The toner for electrostatic image development according to claim 1, which is a pulverized toner obtained by melt-kneading method.

17. The toner for electrostatic image development according to claim 1, wherein the volume-median particle size of the toner is from 3 μm to 15 μm.

18. The toner for electrostatic image development according to claim 2, wherein a weight-average molecular weight of the amorphous acid modified product A of an α-olefin polymer having from 4 to 18 carbon atoms is from 500 to 5,000.

19. The toner for electrostatic image development according to claim 2, wherein the amorphous acid modified product A of an α-olefin polymer having from 4 to 18 carbon atoms is an acid modified product in which the α-olefin polymer having from 4 to 18 carbon atoms is modified with at least one acid selected from the group consisting of maleic acid, fumaric acid, itaconic acid, and anhydrides of these acids.

20. The toner for electrostatic image development according to claim 3, wherein the amorphous acid modified product A of an α-olefin polymer having from 4 to 18 carbon atoms is an acid modified product in which the α-olefin polymer having from 4 to 18 carbon atoms is modified with at least one acid selected from the group consisting of maleic acid, fumaric acid, itaconic acid, and anhydrides of these acids.

* * * * *